May 3, 1938.  R. O. PETERSON  2,116,000

COATING FOR GASKETS AND THE LIKE

Filed March 8, 1935

RUBEN O. PETERSON
INVENTOR
PER

*Albert J. Fihe*

ATTORNEY

Patented May 3, 1938

2,116,000

UNITED STATES PATENT OFFICE 2,116,000

COATING FOR GASKETS AND THE LIKE

Ruben O. Peterson, Glen Ellyn, Ill., assignor to Victor Manufacturing & Gasket Company, Chicago, Ill., a corporation of Illinois Application March 8, 1935, Serial No. 10,050

6 Claims. (Cl. 154—45.5)

This invention relates to an improved coating for gaskets and the like, and has for one of its principal objects the provision of a material which shall render the gasket impervious to water, oil, gasoline, alcohol and other chemicals, and which shall further render the same proof against electrolytic action. The coating also acts as an insulator.

Another important object of the invention is to provide a gasket coating which is capable of being applied in relatively small amounts and of a minimum thickness in that it will not penetrate the material of the gasket itself, such as asbestos fibers or the like, but which will, at the same time, afford adequate protection against penetration of the same by other materials.

A still further object of the invention is to produce a coating for gaskets which can be applied by means of dipping, spraying, or which can even be printed thereon by means of printing rollers or the like, and which will be quite flexible and resilient, so that it will not chip or scale off the gasket either the asbestos or metal portions thereof, and which, furthermore, has remarkable adhesive properties.

A still further important object of the invention is to provide a gasket coating which will withstand temperatures of 1000° F. and which will, at all times, allow the interior of the gasket material to retain its resilient qualities, while, at the same time, protecting the exterior from tackiness or liability to adhere or stick to the cylinder head or block.

Another object is the provision of a coating which can be used in conjunction with some foundation material, as, for example, a thin sheet of paper and which can then be applied to a gasket for protective purposes so as to avoid undesirable scuffing or loosening of the asbestos fibers while handling, and which will, at the same time, retain all its fire, water and oil proofing qualities.

Other and further important objects of the invention will be apparent from the disclosures in the accompanying drawing and following specification.

The invention, in a preferred form, is hereinafter more fully described.

Figure 1:
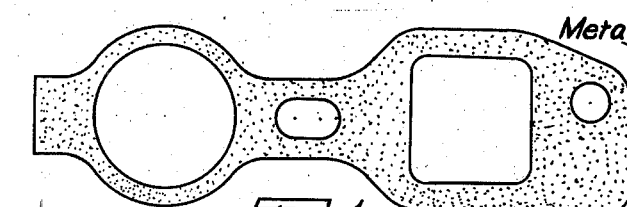
Figure 1 is a top plan view of a representative gasket showing the improved coating of this invention applied thereto.
Figure 2:
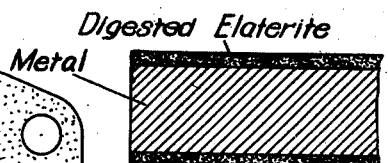
Figure 2 is a cross section of a gasket of metal with one of the improved coatings of this invention thereon and applied to both faces thereof.
Figure 3:
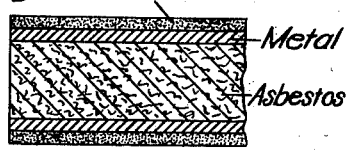
Figure 3 shows an asbestos gasket with metal layers on its face and with improved processed hydrocarbon coating of this invention applied to the outer face of the metal.
Figure 4:
Figure 4 illustrates an asbestos gasket with an inner metal reinforcement and with the coating of this invention applied directly to the asbestos and penetrating to some extent the surface thereof.
Figure 5:
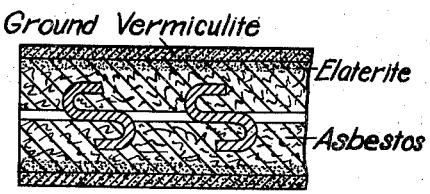
Figure 5 shows a gasket somewhat similar to that illustrated in Figure 4 with an additional coating applied to and over the first coating.
Figure 6:
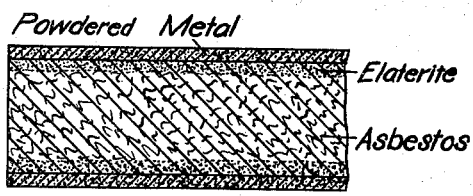
Figure 6 illustrates a plain asbestos gasket with a coating such as that of Figure 4 and with a further coating of powdered metal on the outer surface.
Figure 7:
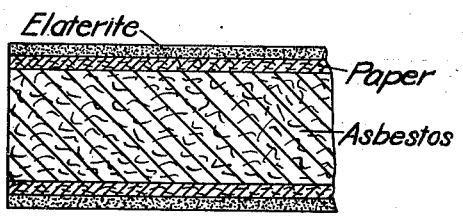
Figure 7 illustrates an asbestos gasket preliminarily covered with paper or the like and with the improved coating of this invention applied to the paper.
Figure 8:
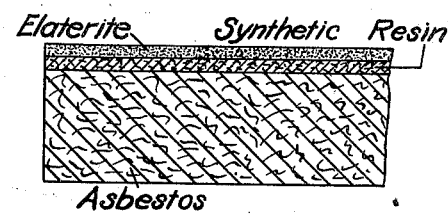
Figure 8 illustrates an asbestos gasket, one face of which is coated with a synthetic resin, after which the improved coating of this invention is applied to the resin.
Figure 9:
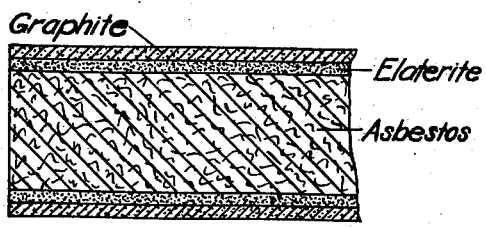
Figure 9 shows a further type of asbestos gasket, the surfaces of which are first covered with the improved coating of this invention, after which graphite is applied. Obviously, the dimensions of the coatings are somewhat exaggerated in the drawing in order to make for a better understanding of the figures.

The improved coating of this invention is composed of a processed hydro-carbon known as elaterite and is prepared with a coal tar or a naphtha solvent in equal amounts with the elaterite in an autoclave under pressure and gradually heating up to a temperature not more than 800° F. which digests the elaterite.

This digested material can then be used as a coating for a gasket or for any other purpose wherein a coating impervious to water, oil, alcohol and similar materials is desired and where the coating is adapted to resist temperatures up to 1000° F.

The material is sufficiently resilient so that it will not chip or scale off a gasket under all normal operating conditions. Further, it will adhere to either metal, asbestos, or other gasket materials with remarkable tenacity.

The insulating qualities of this coating are such that all electrolytic action will be positively prevented between different metals even under the most severe operating conditions encountered in the use of internal combustion engines. In this manner, undesirable corrosive action is eliminated, and the use of gaskets made entirely of metal is rendered possible.

The coating can be applied by dipping, spraying or by simply running the gasket or other material to be coated through printing rollers or the like by means of which this elaterite coating can be applied simply and economically and without any waste. It has been found that a coating of not more than one one-thousandth of an inch is sufficient for all practical purposes.

If desired, the coating need not be applied directly to the surface of a gasket, but may be preliminarily sprayed, dipped or printed upon a sheet of some flexible material such as paper or foil, which prepared sheet can then be mounted on the gasket, taking advantage of the normal adhesiveness or tackiness of the digested elaterite so as to form a good bond between the two surfaces. It has been found by experiment that exposure of such a material to heat which will carbonize the paper or other foundation material will not affect the digested elaterite, thereby causing a satisfactory coating to remain. Obviously, this coating may be used for materials other than gaskets whenever results as described above are desired.

Either before or after the digested elaterite has been applied as a coating, the same may be colored with a pigment, if desired, so that the resultant gasket or other coated device may be produced in colors which might render the same more attractive or more readily identified as the product of a certain manufacturer. Further, the digested elaterite may be preliminarily applied, and the surface, while still tacky, be dusted or otherwise covered with another material, either colored or otherwise, such as, for example, ground vermiculite, a powdered metal or any other substance which may be found desirable or adaptable.

Up to 600° F. there is relatively no change in the mechanical characteristics of the coating material, nor is there any change in its chemical characteristics. Over 600° F. the material becomes more brittle but will not disintegrate or be moved out of its original position until temperatures of over 1000° F. are attained. There is a polymerizing action which gradually progresses as the temperature rises, but ordinarily it may be said that the higher the temperature becomes, the more resistant is the material to any chemical action.

The elaterite itself is used as nearly as possible in its original state, but its properties can be taken advantage of only in its digested form.

The material can be applied in one or more coats, but one coat will actually serve as both a priming coat and a second coat. However, in order to obtain a coating which is as nearly non-porous as possible, two coats of elaterite should be used or a coat of elaterite over some other priming coat, as, for example, a synthetic resin or lacquer.

Gaskets composed entirely of metal may be coated with this material to render them impervious to the action of various fluids and to also afford a more resilient structure. Such an all-metal gasket cannot be absolutely water-sealed without a coating of a type such as this. It has been found that two or more coats produce a very satisfactory sealing effect together with additional resilience. Gaskets composed of combinations of packing material such as asbestos and metal may also be coated with this material to considerable advantage.

The asbestos packing may be saturated with the processed elaterite, either alone or mixed with a vegetable oil.

In the case of gaskets which have an inner metal reinforcing structure, the elaterite may be thinned before application in order to obtain considerable penetration, and it has been found that by its use, the fibers of asbestos will not have the undesirable tendency to pull away from the metal insert.

I am aware that many changes may be made in the composition and numerous other ingredients may be added to the digested elaterite to form coatings suitable for various purposes without departing from the principles of this invention, and I, therefore, do not purpose limiting the patent granted hereon otherwise than as necessitated by the prior art.

I claim as my invention:

1. A gasket comprising a packing material and a unitary coating of foil and digested elaterite thereover.

2. A gasket comprising a packing material and a combination unitary coating of paper and digested elaterite applied to the surfaces thereof.

3. A covering material for gaskets, comprising a foundation of fibrous material and digested elaterite applied thereto, and a further coating of metallic dust over the digested elaterite.

4. A covering material for gaskets, comprising a foundation of fibrous material and digested elaterite applied thereto, and a further coating of ground vermiculite over the digested elaterite.

5. A gasket, comprising a sheet of packing material, and a coating of digested elaterite on the surfaces thereof, together with a further coating of graphite over the whole.

6. A gasket, comprising a sheet of asbestos, and a covering therefor, said covering comprising a relatively thin sheet of fibrous material coated with digested elaterite.

RUBEN O. PETERSON.